(12) United States Patent
Brunzema et al.

(10) Patent No.: US 11,169,974 B1
(45) Date of Patent: Nov. 9, 2021

(54) DATABASE SETUP USING A MASTER COPY

(71) Applicant: SAP SE, Walldorf (DE)

(72) Inventors: Martin Brunzema, Dielheim (DE); Anne Roessiger, Berlin (DE); Henrik Hempelmann, Havelberg (DE); Stefan Voss, Potsdam (DE); Benedikt Klus, Hamburg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/870,118

(22) Filed: May 8, 2020

(51) Int. Cl.
*G06F 16/21* (2019.01)
*H04L 29/08* (2006.01)
*G06F 21/62* (2013.01)
*G06F 16/27* (2019.01)

(52) U.S. Cl.
CPC .............. *G06F 16/21* (2019.01); *G06F 16/27* (2019.01); *G06F 21/6218* (2013.01); *H04L 67/1097* (2013.01)

(58) Field of Classification Search
CPC .......................... G06F 16/6218; H04L 67/1097
USPC .......................................................... 707/803
See application file for complete search history.

(56) References Cited

U.S. PATENT DOCUMENTS

| | | | | |
|---|---|---|---|---|
| 6,035,412 A | * | 3/2000 | Tamer ................. | G06F 11/1466 707/999.202 |
| 2013/0339471 A1 | * | 12/2013 | Bhargava ............ | G06F 11/1451 709/213 |
| 2018/0239677 A1 | * | 8/2018 | Chen .................... | G06F 11/2094 |

* cited by examiner

*Primary Examiner* — Wing F Chan
*Assistant Examiner* — Leon Y Tseng
(74) *Attorney, Agent, or Firm* — Buckley, Maschoff & Talwalkar LLC

(57) ABSTRACT

A system and method to receive, by a cloud infrastructure database service provider, a request for a new database service from an entity external to the cloud infrastructure, the request including an indication the requested database service is to be created using a master copy of a database service; create, in response to the request, a partially initialized database service and a recovery job to access a resource external to the cloud infrastructure; receive, by the partially initialized database service, a master copy of the requested database service from the external resource, the master copy including data content; and fully initialize the database service using at least some of the data content included in the master copy of the requested database service.

20 Claims, 5 Drawing Sheets

300

305 RECEIVE, BY A CLOUD INFRASTRUCTURE DATABASE SERVICE PROVIDER, A REQUEST FOR A NEW DATABASE SERVICE FROM AN ENTITY EXTERNAL TO THE CLOUD INFRASTRUCTURE, THE REQUEST INCLUDING AN INDICATION THE REQUESTED DATABASE SERVICE IS TO BE CREATED USING A MASTER COPY OF A DATABASE SERVICE

310 CREATE, IN RESPONSE TO THE REQUEST, A PARTIALLY INITIALIZED DATABASE SERVICE AND A RECOVERY JOB TO ACCESS A RESOURCE EXTERNAL TO THE CLOUD INFRASTRUCTURE

315 RECEIVE, BY THE PARTIALLY INITIALIZED DATABASE SERVICE, A MASTER COPY OF THE REQUESTED DATABASE SERVICE FROM THE EXTERNAL RESOURCE, THE MASTER COPY INCLUDING DATA CONTENT

320 FULLY INITIALIZE THE DATABASE SERVICE USING AT LEAST SOME OF THE DATA CONTENT INCLUDED IN THE MASTER COPY OF THE REQUESTED DATABASE SERVICE

*FIG. 3*

DATABASE SETUP USING A MASTER COPY

BACKGROUND

A number of large cloud infrastructure and service providers have emerged to provide the infrastructure to support customers in need of robust and reliable storage and compute needs. A benefit offered by these providers is that they are highly scalable, responsive to their customers' increasing storage and processing needs. These large cloud infrastructure and service providers, also referred to as hyperscalers, may provide the hosting infrastructure for different types of services, including for example, a database service. In some aspects, setting up a new database for productive use by a customer includes configuring the core functionalities of the database, as well as configuring the database with application-specific content essential to the customer's operations. The process of bringing the application-specific content into the database system might be accomplished in some conventional systems using a set of database language (e.g., SQL) statements. However, such a process can be very time consuming and resource hungry, as well as fraught with errors.

Such a process is not practical or feasible in a hyperscaler environment where a large cloud infrastructure and service provider may host services and storage for hundreds of thousands or even millions of customers. That is, traditional processes of initializing a database do not readily scale and thus are not suitable for providing database systems on a large scale in a hyperscaler environment.

Accordingly, there exists a need for an efficient and robust system and process to setup and initialize a database system in a hyperscaler environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is an illustrative flow diagram of a process for initializing a database service in a hyperscaler environment using a master copy, in accordance with an example embodiment.

Figure 1:
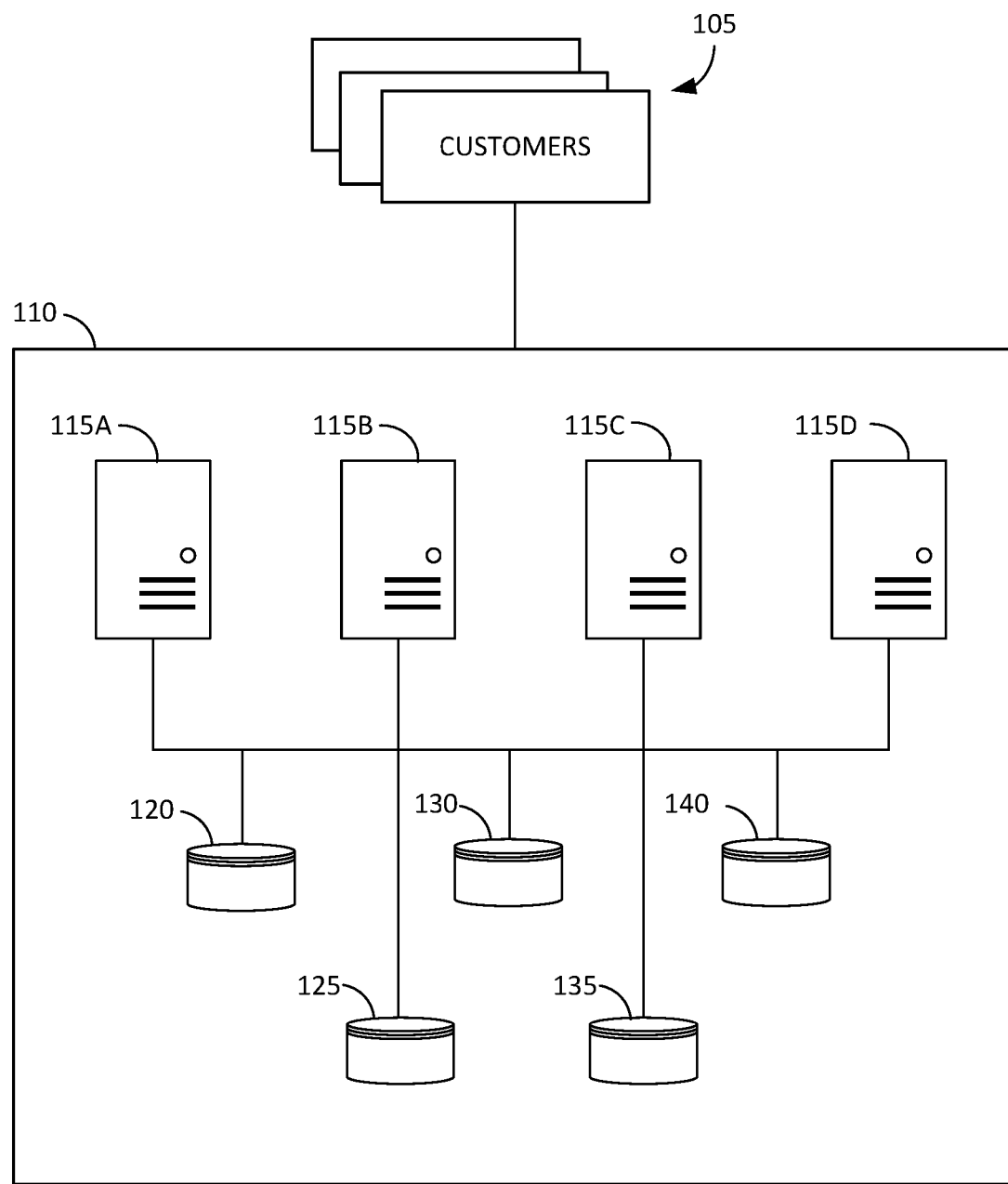
FIG. 1 is an illustrative block diagram of a hyperscaler environment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers provide cloud storage and compute infrastructures on a scale (i.e., size and extent) that far exceeds that of typical, conventional data centers. Hyperscalers may provide, maintain, and upgrade the infrastructure, including hardware, (customized) software, facilities, power management systems, etc. to provide services to customers with improved uptime. While Hyperscalers might provide a number of different services to end users (e.g., customers), aspects related to the initialization or setup of a database service provided by a hyperscaler are, in some embodiments, significant to the present disclosure.

FIG. 1 is a high level illustrative depiction of a hyperscaler architecture 100, in accordance with an embodiment herein. A hyperscaler 110 includes all of the hardware, software, networks, facilities, energy management systems, and other operational aspects, whether custom or commodity acquisitions, to enable and support large cloud infrastructure and services for large numbers of users 105 (e.g., millions of customers of hosted services). All of these different aspects of the hyperscaler are not shown in FIG. 1. FIG. 1 includes illustrative representations of the many (e.g., >100,000) servers and storage devices implemented by the example hyperscaler to support the massive storage and compute capabilities of the its cloud infrastructure. Shown are servers 115A, 115B, 115C, and 115D that are networked to each other and to data storage devices/systems 120, 125, 130, 135, and 140. The servers and data storage devices depicted in FIG. 1 may include redundancies of some or all of each other to provide, in conjunction with certain executable processes, the reliability and resiliency of the hyperscaler environment 100. Additionally, FIG. 1 is an illustrative, figurative representation of hyperscaler servers and data storage devices/systems, as opposed to an actual physical or logical configuration thereof. In some aspects, the features of the present disclosure are not limited to any particular configuration or implementation of a hyperscaler.

Hyperscaler 100 may host a database for one or more of customers 105 in the cloud provided by its cloud infrastructure, where the database is provided as a service to the clients (i.e., Database-as-a-Service, DBaaS). In some aspects, the database offered by hyperscaler 100 stores backups for database service instances in an object storage where the backups (i.e., data) are stored as distinct "objects". Referring to the example of FIG. 1, the object storage may be provided and maintained by the storage devices/systems 120, 125, 130, 135, and 140, in part and/or different combinations.

In some aspects, a hyperscaler database service provider may provide cloud infrastructure and database services to customer users thereof. A setup or initialization of a database service by a database service provider in a hyperscaler environment might involve the database service provider creating a database service including, for example, some amount of prefilled tables, empty tables, coding, other data structures, and other data that might be useful to a database service for a particular customer. The database service created by the database service provider can be further configured for operation using application-specific data that can be provided by the customer to the database service provider. From one perspective, the database service provider might be seen as creating the "engine" (i.e., the database service) and the customer might be viewed as being responsible for providing the requisite data to complete the setup and the use of the database service.

In some embodiments, the present disclosure relates to a system and process to initialize a new database service in a hyperscaler environment with at least some existing content, including application-specific data content belonging to a customer of the database service provider. In some aspects, the application-specific data content may belong to and be provided to the database service provider by the customer. In some respects, an entity (e.g., a customer user) external to the hyperscaler environment of the database service provider might not be able to directly, actively copy data into the infrastructure of the database service provider, for one or more security reasons. Accordingly, there is a need for a process to efficiently and securely transfer the customer (i.e., external entity) provided application-specific data content to the infrastructure of a database service provider to initialize a new database service provided by the database service provider in a hyperscaler environment.

Figure 2:
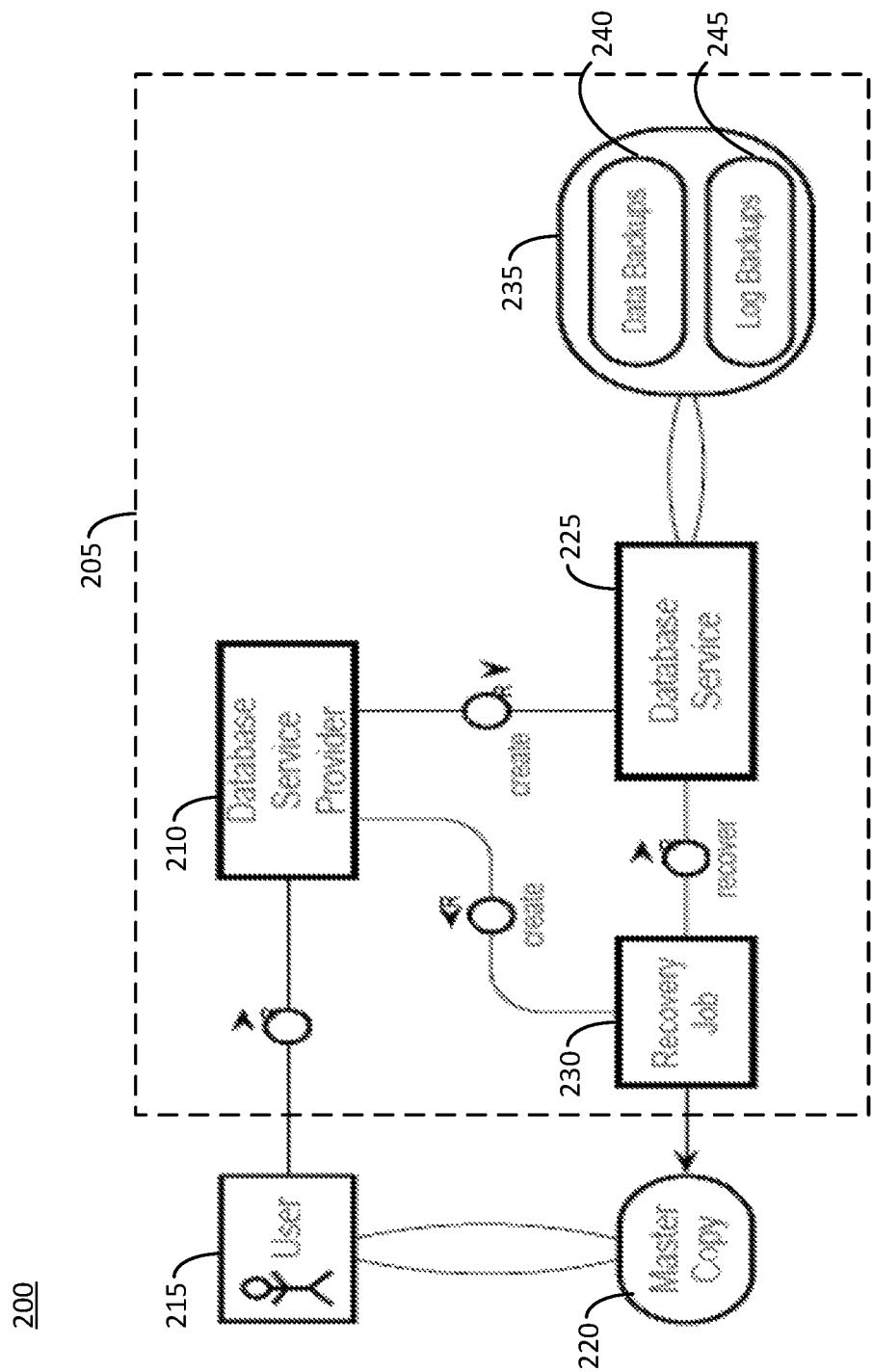
FIG. 2 is an illustrative block diagram of an architecture for initializing a database service in a hyperscaler environment using a master copy, in accordance with an example embodiment.

FIG. 2 is a schematic block diagram illustrating an overview of an architecture 200 including a hyperscaler environment 205. The hyperscaler environment includes a database service provider 210. In some embodiments, database service provider 210 may comprise a system to provide and support database services. In some embodiments, a new database service provided by database service provider 210 within hyperscaler environment 205 might be initialized with at least some existing content being provided by database service provider 210 and some content (e.g., application-specific data content) being provided by an external customer or user 215 of the database service provider.

In some embodiments, the content to be provided by external user 215 to database service provider 210 within hyperscaler 205 may include one or more of database tables, including empty tables and at least partially filled tables, static code, executable code, data structures, and other data and content to fully enable the setup or initialization of a new database service provided by hyperscaler 205. In an effort to support the provisioning of the user-supplied content for the setup or initialization of a new database service, user 215 may create a master copy 220 of the database that includes user-supplied content to complete a setup or initialization of a new database service in hyperscaler 205. The creation of master copy 220 might be a one-time operation since the content included in the master copy may only need to be provided to database service provider 210 once. In some aspects, once the data service provider has the content of the master copy to fully initialize a database service, the database service provider might make copies (i.e., backups) of the master copy as needed to implement multiple instances of the database service. In some aspects, user 215 may create a different version of a master copy that corresponds to a different version of a database service, including, for example, an application, suite of applications, or other product that provides at least some of its content as database content.

In some embodiments, master copy 220 may be stored in a data storage device or system controlled by user 215. The data storage device or system controlled by the user might be an object data store, which might be similar in some aspects to an object store 235 of hyperscaler 205 that is used to store backups of a data service as distinct "objects". Note that while master copy 220 might be an object stored in an external object store of user 215, the user's object store is different than and distinct from object store 235. In particular, access to the user's object store is controlled by the external user and access to object store 235 is controlled by database service provider 210 of hyperscaler 205 and direct access thereto may not, for one or more implemented security constraints, be extended to the external customer(s).

In some embodiments herein, a process to setup or initialize a new database service provided by hyperscaler 205 may include user 215 sending a request for the new database service to database service provider 210 of hyperscaler environment 205. Upon receipt of the request for the new database service, database service provider may invoke two actions. One action may be to create the requested database service 225, wherein the creation of the database service includes configuring the database service instance 225 with the data structures, functionalities, at least some data content, and other aspects (e.g., access rights, etc.) to partially initialize the database service instance. Accordingly, the database service instance partially initialized in response to the request from the new database service is not an empty database service. In some aspects, database service instance 225 is partially initialized with sufficient functionality to participate in a recovery action of a recovery process. The other action invoked by the database service provider in response to the reception of the request for the new database service from user 215 may be to create a recovery job 230, that will operate to retrieve or fetch master copy 220 from the object store of user 215 and bring it into the infrastructure of hyperscaler 205.

In some aspects, recovery job 230 is an active component that is able to access the external storage device or system containing master copy 220. In some embodiments, user 215 may provide additional information to database service provider 210 so that the database service provider, via recovery job 230, can have read access to master copy 220 in the user's external storage device or system. In some embodiments, the additional information provided to database service provider 210 from user 215 might include, for example, access credentials, a name (e.g., an object key as used in the storage and retrieval of the master copy in an object store) of the master copy, a storage location of the master copy, and other information, which, alone or in combination, may be sufficient to allow the database service provider to gain read access to the user's data storage system or device to retrieve the master copy into the hyperscaler thereof.

Recovery job 230, enabled to access master copy 220 (e.g., by credentials or implicit authentication), may retrieve the master copy from the user's data storage device and system (e.g., external object store) and pass or otherwise provide it to the partially initialized database service 225 to complete its recovery process.

The content included in the master copy 220 that is retrieved from user 215 and returned to the database service (i.e., recovered) may be used to complete the initialization of database service 225. As introduced above, the content of the master copy may include one or more tables and other database structures (whether empty or at least partially prefilled with data), instructions, executable code, static data, text, and other information (essentially any type of data, including for example blobs, streams of data, etc.) to complete the initialization or setup of database service 225.

FIG. 2 further shows object store 235 that is used by database service 225 to store backups thereof, including data backups 240 and the log backups 245 associated with the data backups. In some embodiments, the backups stored in object store 235 may comprise a clone of the established database service 225.

FIG. 3 is an illustrative flow diagram of a process 300 for initializing a database service in a hyperscaler using a master copy provided by an entity external to the hyperscaler environment, in accordance with an example embodiment. In some embodiments, process 300 might be implemented by a system having an architecture similar to that depicted in FIG. 2. At operation 305, a request for a new database service is received by a cloud infrastructure database service provider or hyperscaler from the external entity. In some aspects, the request may include an indication that the database service is to be setup using a master copy provided by the external entity (e.g., a customer user). In some instances, the indication that the database service is to be setup using a maser copy may be explicit (e.g., a specific data field value, flag, or declaration) or it may be implied (e.g., the absence of a specific data field value, flag, or declaration) in the request.

At operation 310, the database service provider may create a partially initialized database service in reply to the request of operation 305. The database service provider may further create a recovery job to carry out a recovery process for the partially initialized database service created in reply to the request. The recovery job is created to access and obtain a master copy of the requested database service that will be used to complete the initialization of the database service.

At operation 315, the recovery job retrieves the master copy from the external entity, wherein the master copy includes data content that is used to complete the initialization of the database service partially initialized at operation 310. Operation 320 encompasses the act of fully initializing the database service based on the content included in the master copy as retrieved from the external entity.

Note that a single master copy is retrieved for each database service initialized in accordance with some embodiments herein. For example, if a hyperscaler has thousands of external customers, a new database service request might be received, one for each customer. In accordance with the present disclosure, in response to each request a new database service is created and a recovery job is created that has special capabilities to access external resources. Other services of the hyperscaler might not need to talk to outside entities, and may thus be restricted from doing so. The master copy of the database service provided by the external user is consumed by the database service during the recovery process to complete the setup of the requested new database service based on the master copy. After the setup of the database service a connection to the external entity no longer exists. The connection to the external entity may be provided strictly for the initial seeding of the database service and the master copy may not be accessed twice for a single database service.

Figure 4:
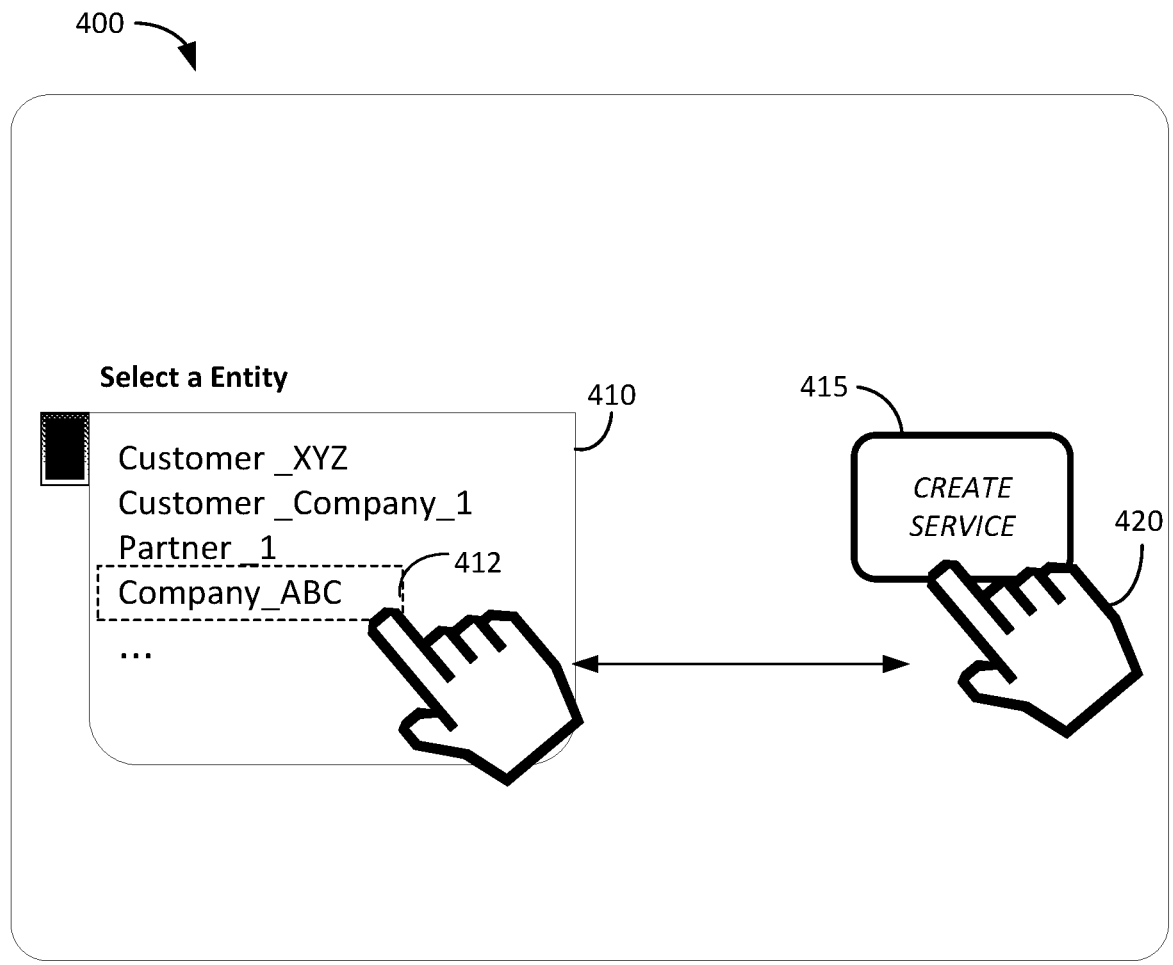
FIG. 4 is an outward facing user interface related to a system and process for versioning cloud storage objects independent of a hyperscaler, in accordance with an example embodiment.

FIG. 4 is an illustrative diagram of an outward facing user interface (UI) 400 related to a database service initialization system and process using a master copy in a hyperscaler environment, in accordance with an example embodiment. UI 400 may be displayed within a display device associated with a database backup service or a display device independent of the database service (e.g., a display of a device or system in communication with the database service over a network via a browser application). Selection of one or more UI elements (e.g., icons, buttons, drop-down menu options, etc.) by a touchscreen input, computer pointer 405, etc. may result in the initialization of a database service in a hyperscaler environment implemented by using a master copy (i.e., backup) of the database service being created (e.g., the selection of "Create Database Service" button 410). In the example of FIG. 4, UI 400 includes a UI element 415 for selecting a particular customer via a drop-down menu that may facilitate selection and entry of a particular customer for whom the database service is being created. In some aspects, the particular customer selected at 415 may result in the new database service being created to include certain functionalities and/or capabilities.

Figure 5:
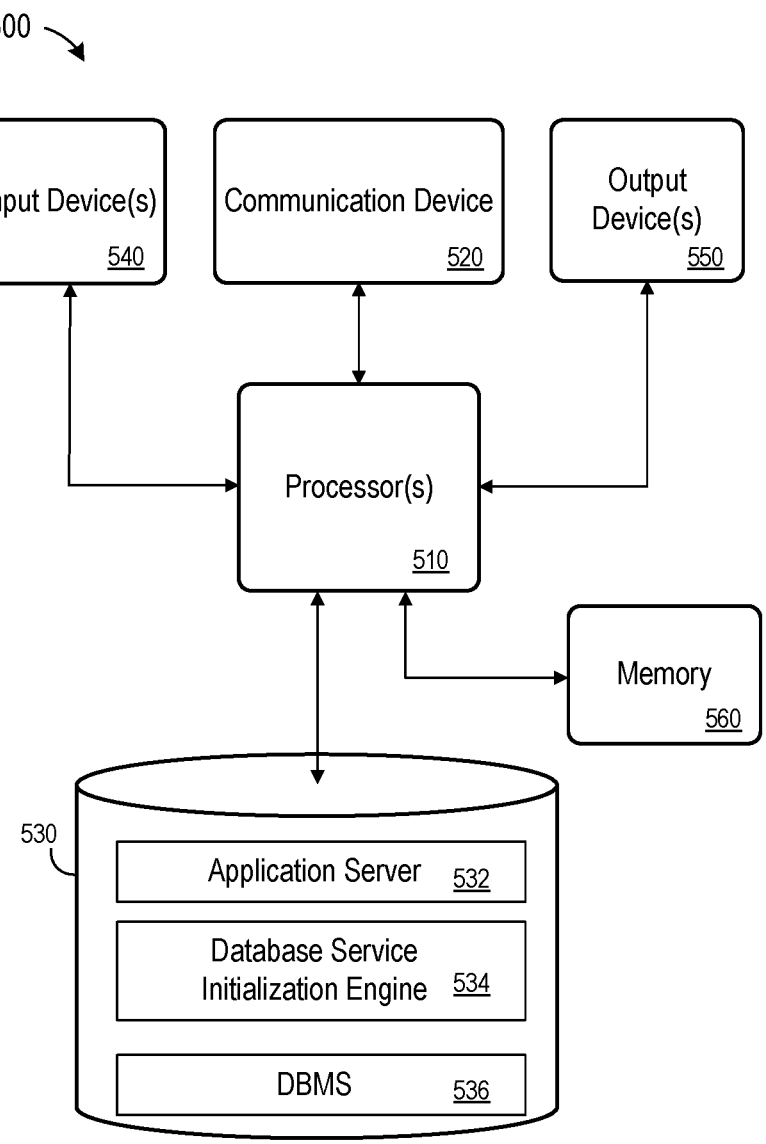
FIG. 5 is an illustrative block diagram of a computing system, in accordance with an example embodiment.

FIG. 5 illustrates a computing system 500 that may be used in any of the architectures or frameworks (e.g., FIG. 2) and processes (e.g., FIG. 3) disclosed herein, in accordance with an example embodiment. FIG. 5 is a block diagram of server node 500 embodying a database service initialization, according to some embodiments. Server node 500 may comprise a general-purpose computing apparatus and may execute program code to perform any of the functions described herein. Server node 500 may comprise an implementation of at least some features of architecture 200 of FIG. 2 in some embodiments. Server node 500 may include other unshown elements according to some embodiments.

Server node 500 includes processing unit(s) 510 operatively coupled to communication device 520, data storage device 530, one or more input devices 540, one or more output devices 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Application server 532 may each comprise program code executed by processor(s) 510 to cause server 500 to perform any one or more of the processes described herein. Database service initialization engine 534 may execute one or more processes to implement the setup of a database service using a master copy in a hyperscaler environment. Embodiments are not limited to execution of these processes by a single computing device. Data storage device 530 may also store data and other program code for providing additional functionality and/or which are necessary for operation of server 500, such as device drivers, operating system files, etc. DBMS 536 may store and manage a variety of data types and structures, including, for example, master copies.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
    a memory storing processor-executable program code; and
    a processor to execute the processor-executable program code in order to cause the system to:
        receive, by a cloud infrastructure database service provider, a request for a new database service from an entity external to the cloud infrastructure, the request including an indication the requested database service is to be created using a master copy of a database service;
        create, in response to the request, a partially initialized database service and a recovery job to access a resource external to the cloud infrastructure;
        receive, by the partially initialized database service, a master copy of the requested database service from the external resource, the master copy including data content; and
        fully initialize the database service using at least some of the data content included in the master copy of the requested database service.

2. The system of claim 1, wherein the master copy of the requested database service is received from the external resource just once for the initialization of the requested database service.

3. The system of claim 1, wherein the data content included in the master copy of the requested database service enables at least one functionality of the requested database service.

4. The system of claim 1, wherein the request includes additional information to grant access to the external resource to the cloud infrastructure database provider.

5. The system of claim 4, wherein the additional information includes at least one of a location of the master copy of the requested database service, a name of the master copy of the requested database service, and an access credential to the master copy of the requested database service.

6. The system of claim 1, wherein the resource external to the cloud infrastructure includes an object store whose access is controlled by the entity external to the cloud infrastructure.

7. The system of claim 1, wherein the processor further executes the processor-executable program code in order to cause the system to transfer the received master copy of the requested database service to an object store of the cloud infrastructure database provider, the transfer being effectuated by a recovery process of the created database service.

8. A computer-implemented method, the method comprising:
    receiving, by a cloud infrastructure database service provider, a request for a new database service from an entity external to the cloud infrastructure, the request including an indication the requested database service is to be created using a master copy of a database service;
    creating, in response to the request, a partially initialized database service and a recovery job to access a resource external to the cloud infrastructure;
    receiving, by the partially initialized database service, a master copy of the requested database service from the external resource, the master copy including data content; and
    fully initializing the database service using at least some of the data content included in the master copy of the requested database service.

9. The method of claim 8, wherein the master copy of the requested database service is received from the external resource just once for the initialization of the requested database service.

10. The method of claim 8, wherein the data content included in the master copy of the requested database service enables at least one functionality of the requested database service.

11. The method of claim 8, wherein the request includes additional information to grant access to the external resource to the cloud infrastructure database provider.

12. The method of claim 11, wherein the additional information includes at least one of a location of the master copy of the requested database service, a name of the master copy of the requested database service, and an access credential to the master copy of the requested database service.

13. The method of claim 8, wherein the resource external to the cloud infrastructure includes an object store whose access is controlled by the entity external to the cloud infrastructure.

14. The method of claim 8, wherein the processor further executes the processor-executable program code in order to cause the system to transfer the received master copy of the requested database service to an object store of the cloud infrastructure database provider, the transfer being effectuated by a recovery process of the created database service.

15. A non-transitory, computer readable medium storing instructions, which when executed by at least one processor cause a computer to perform a method comprising:
   receiving, by a cloud infrastructure database service provider, a request for a new database service from an entity external to the cloud infrastructure, the request including an indication the requested database service is to be created using a master copy of a database service;
   creating, in response to the request, a partially initialized database service and a recovery job to access a resource external to the cloud infrastructure;
   receiving, by the partially initialized database service, a master copy of the requested database service from the external resource, the master copy including data content; and
   fully initializing the database service using at least some of the data content included in the master copy of the requested database service.

16. The non-transitory, computer readable medium of claim 15, wherein the master copy of the requested database service is received from the external resource just once for the initialization of the requested database service.

17. The non-transitory, computer readable medium of claim 15, wherein the data content included in the master copy of the requested database service enables at least one functionality of the requested database service.

18. The non-transitory, computer readable medium of claim 17, wherein the request includes additional information to grant access to the external resource to the cloud infrastructure database provider.

19. The non-transitory, computer readable medium of claim 15, wherein the additional information includes at least one of a location of the master copy of the requested database service, a name of the master copy of the requested database service, and an access credential to the master copy of the requested database service.

20. The non-transitory, computer readable medium of claim 15, wherein the processor further executes the processor-executable program code in order to cause the system to transfer the received master copy of the requested database service to an object store of the cloud infrastructure database provider, the transfer being effectuated by a recovery process of the created database service.

\* \* \* \* \*